United States Patent Office 3,198,674
Patented Aug. 3, 1965

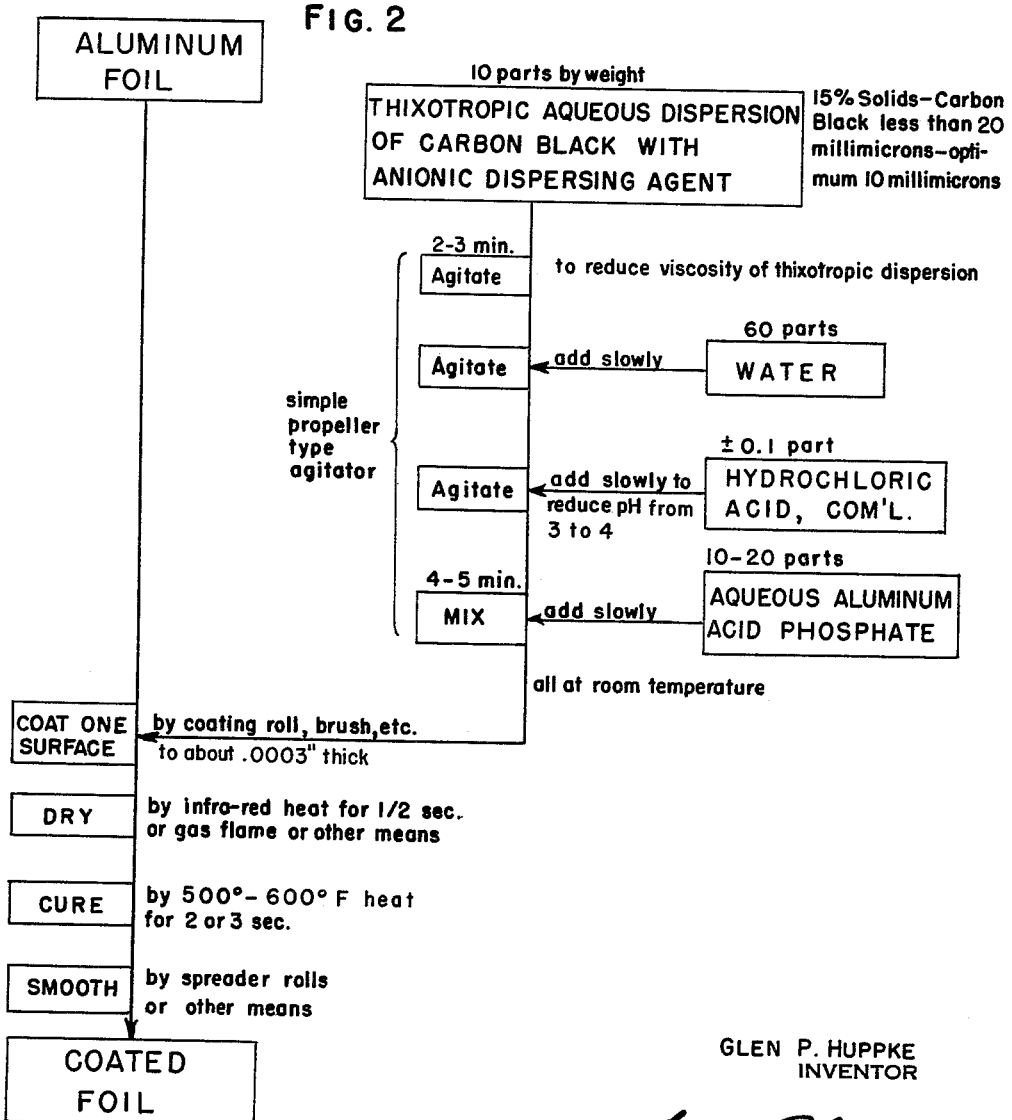

3,198,674
INFRARED ABSORBENT ALUMINUM PHOSPHATE COATINGS AND METHOD OF MANUFACTURE
Glen P. Huppke, Beaver Falls, N.Y., assignor to Fiber Products Research Center, Inc., Beaver Falls, N.Y., a corporation of New York
Filed Jan. 25, 1962, Ser. No. 168,649
10 Claims. (Cl. 148—6.15)

This invention relates to aluminum phosphate coatings having high infrared absorbent capability and relates more particularly to such coatings made from aqueous aluminum acid phosphate and carbon black. Although not limited to such use, the coating of this invention is particularly suited for application to aluminum foil and articles made of aluminum or aluminum alloy, where the final product is to be used for cooking foodstuffs. The coating of this invention affords a number of advantages over prior coatings for the same general purpose.

In my co-pending application Serial No. 859,927, filed December 16, 1959, now Patent No. 3,070,460, granted December 25, 1962, I have described an aluminum cooking foil for use in the baking and broiling of foods, coated on one side with an infrared absorbent coating made, in its preferred form, of carbon black, sodium silicate and a metallic oxide capable of decreasing the solubility of the silicate upon dehydration thereof, such as magnetic iron oxide. The resulting coating is non-toxic, non-volatile, non-combustible, physically stable and reasonably inert chemically, as well as having good infra-red absorptive capability, and provides, therefore, a very satisfactory cooking foil. As pointed out in that application, however, under certain conditions of prolonged exposure to an atmosphere of high humidity, it is difficult completely to avoid efflorescence of the coating. This efflorescence is caused by partial conversion of the dehydrated sodium silicate into sodium carbonate.

According to the present invention, not only is any such efflorescence or similar chemical change completely avoided, but a coating is obtained having improved characteristics over said silicate coating in other respects than chemical stability. In particular, the coating of the present invention is considerably thinner, has better adherence, and provides improved infrared absorption and heat transfer to the backing material. I am, therefore, enabled to use my present coating not only on aluminum cooking foil but on other articles made of aluminum or aluminum alloy where high infrared absorption is desired on one or more surfaces, such as pie pans and other cooking utensils, sheet aluminum packages containing frozen foods that are subsequently to be cooked in the package and, indeed, in a great variety of situations.

A primary object of this invention is the provision of a stable aluminum phosphate coating having high infrared absorptive capacity.

Another object is the provision of a stable aluminum phosphate coating having high infrared absorptive capacity, which is of extreme thinness and has remarkable adherence.

A further object of this invention is the provision of a high infrared absorptive aluminum phosphate coating which has superiod adherence to aluminum articles, apparently by reason of a chemical reaction between the article and the aluminum acid phosphate used in the manufacture of the coating, and which coating possesses those other properties necessary for use in connection with the handling and cooking of foodstuffs.

Other objects and advantages will become apparent from the following description and the accompanying drawings, in which:

FIGURE 1 is a diagrammatic view of the coating of this invention applied to aluminum foil, and lists the ingredients of the final coating; and FIGURE 2 is a flow sheet illustrating the preparation and application of a coating according to this invention to aluminum foil, together with the preferred components and their optimum treatment and proportions.

The binder used in the coating of this invention is aqueous aluminum acid phosphate. This material is commercially available as "Alkophos C" and "Alkophos CE" manufactured by Monsanto Chemical Company, or, if desired, it may be made as described in Steinherz Patent 2,743,203, issued April 24, 1956. I have found Alkophos C to be highly suitable and to be preferable to Alkophos CE, because the former has a considerably lower viscosity and perhaps also because it has a lower ratio of phosphoric acid, $H_3PO_4$, to aluminum hydrate, $Al(OH)_3$. In the case of Alkophos C, this ratio is about 3.8 to 1, whereas that of Alkophos CE is substantially higher and the Steinherz patent prefers a still higher ratio, namely, at least 4.5 to 1. The chemical formula of Alkophos C is $Al(H_2PO_4)_3$, and a typical analysis is as follows:

$P_2O_5$, percent _____ 33.1
$Al_2O_3$, percent _____ 8.6
Viscosity at 25° C., c.p.s. (as manufactured) ___ 35 to 90
Specific gravity 25/15.5° C. _____ 1.47
Percent loss at 110° C. _____ 48.0

When an aqueous aluminum acid phosphate, such as Alkophos C, is coated on a suitable base material and subjected to heat, it decomposes, at 208° C., into aluminum acid pyrophosphate, and then, at 238° C. (460° F.), into aluminum metaphosphate. Both of these dehydration products are glassy films that are water insoluble, physically stable, non-toxic and chemically inert. Where the base material is aluminum or an alloy the major portion of which is aluminum, a chemical reaction appears to occur at the interface between the metal surface and the coating, resulting in an extremely adherent coating. Pretreatment of the aluminum metal surface, such as anodizing, is neither necessary nor desirable, except that the surface should be clean and, in particular, reasonably free from oil.

To make such a coating infrared absorptive, it is only necessary to incorporate in the coating carbon black or other pigment having a black or dark color and good temperature stability, and which is color stable when subjected to the action of hot phosphoric acid. Carbon black has the virtue of being readily available and less expensive than other such pigments. The carbon black must be finely divided so as to obtain good coverage with a thin coating film. For this reason the carbon black particles should preferably not exceed 20 millimicrons in size, and I have found the optimum size to be in the neighborhood of 10 millimicrons. The carbon black should be substantially free from volatile organic materials, otherwise the volatiles will be released during the curing step of the process of application, resulting in ruptures and irregularities in the coating film. For this reason, I prefer to use a high quality channel black rather than furnace blacks.

The difficulty is that most commercially obtainable carbon blacks cannot be incorporated readily, if at all, in aqueous aluminum acid phosphate. The usual carbon blacks tend to gel or coagulate when combined with aqueous aluminum acid phosphate, resulting in a lumpy or non-homogeneous mixture that will not make a satisfactory coating. While in some cases, a uniform mixture can be obtained by ball milling or the like for extremely long periods of time, this is an expensive procedure that is not desirable in commercial production.

I have discovered that this difficulty can be overcome, and a highly desirable coating mixture obtained, by (1) suspending the carbon black in water by means of an anionic dispersing agent, which gives an aqueous dispersion that is, usually, thixotropic and quite basic, (2) adding acid to this dispersion unit its pH is brought well over onto the acid side, and (3) combining the acidified dispersion with aqueous aluminum acid phosphate. These steps may be accomplished at room temperature with only moderate agitation such as that which is provided by an ordinary propellor type agitator.

Such a thixotropic, basic, aqueous dispersion of carbon black with an anionic dispersing agent in commercially available from Columbia Carbon Company under the trade name "Aquablak U." This product contains about 15% carbon black with a particle size of the order of 9 to 13 millimicrons. The particular anionic dispersing agent in the formulation of this product is maintained as a trade secret. However, an equally satisfactory dispersion of similar properties may be made by dispersing 15 parts by weight of a high quality channel black of comparable particle size in 79.5 parts by weight of distilled water by the aid of 5.5 parts by weight of an anionic dispersing agent known as "Tamol SN." The mixture is ball milled for 24 hours to produce the dispersion. "Tamol SN" is manufactured by Rohm & Haas Company, and is the neutral sodium salt of a complex, condensed organic acid. It is a tan colored, free flowing powder that is readily soluble in water.

My preferred coating process is shown in flow sheet form in FIGURE 2. Starting with 10 parts by weight of a thixotropic aqueous dispersion of carbon black, such as "Aquablak U," I first agitate the dispersion for from 2 to 3 minutes with a simple propellor type agitator, in order to reduce its viscosity. I then add slowly 60 parts by weight of water while continuing the agitation. Still agitating, I add slowly sufficient commercial hydrochloric acid to bring the pH of the dispersion well over to the acid side, preferably to from 3 to 4. This ordinarily requires about 0.1 part by weight of the acid. The dispersion need not be as acid as the aluminum acid phosphate, but its pH should preferably be not far above that of the latter, in order to avoid coagulation of the carbon black when the phosphate is added. While still agitating, I then add slowly from 10 to 20 parts by weight, preferably about 15 parts, of aqueous aluminum acid phosphate, such as the above described Alkophos C, and continue the mixing by agitation for from 4 to 5 minutes. All of the above operations may be conducted at room temperature.

The aqueous aluminum acid phosphate is strongly acid, having a pH of about 0.9. With the above preferred proportions and with the pH of the diluted carbon black dispersion reduced to 3, the pH of the final coating mixture is about 1.7.

The result of the foregoing operations is a smooth, homogeneous, free flowing, liquid black ink. This ink is reasonably stable, may be stored for considerable periods of time, and may be shipped. In itself, it constitutes a desirable new article of commerce. The proportion of water is not critical, so long as the ink is sufficiently thin for easy application, either directly or after simple dilution with water. In the finished ink, the 10 parts of carbon black dispersion corresponds to 1.5 parts by weight of anhydrous carbon black, and the 10 to 20 parts of aqueous aluminum acid phosphate corresponds to about 4.2 to 8.4 parts by weight of anhydrous aluminum and phosphoric oxides, or 1 part by weight of anhydrous carbon black to from about 2.8 to about 5.6 parts by weight of the anhydrous oxides. I prefer to use weight ratios of carbon black to oxides of 1 to from about 3 to about 5. The pH of the ink is preferably from 1 to 3. As the pH increases, there is an increased tendency for the ink to thicken, particularly on long standing.

For the coating proper, the ink is applied to the surface of the article to be coated so as to form a layer preferably about 0.0003" thick. Where one side of aluminum foil is to be coated, this may conveniently be done by a conventional coating roll, although brushing or spraying may be used if desired. The coating is then dried by evaporating the free water from the film. I have found it convenient to perform this drying step by the application of infrared heat for about one-half second, but the drying may be done by a gas flame or other conventional means.

After drying, the coating is cured by heating it to from 500° F. to 600° F. for two or three seconds. This may conveniently be done in an oven through which the strip of foil passes continuously. During this curing step, the aluminum acid phosphate is decomposed first into aluminum acid pyrophosphate and then into aluminum metaphosphate, as above described. By the described curing procedures, conversion into the metaphosphate is probably substantially complete, since this reaction takes place at 460° F., but some pyrophosphate may remain, particularly when operating near the lower limits of the specified temperature and time ranges. During the curing step, the anionic dispersing agent, being organic, breaks down, and is not present in the final coating except in minute quantities and in the form of its decomposition products. The final coating is a glassy, homogeneous layer, and the finely divided carbon black is uniformly suspended throughout the coating. The coating is stable at high temperatures and, indeed, is even more heat resistant than the foil itself.

In the case of aluminum foil, it is desirable to smooth the foil as a final step after coating, for example, by passing it over conventional spreader rolls.

By the above described process, a coated aluminum foil is obtained in which the coating is of extreme thinness, being of the order of 0.00001" to 0.00002" thick. Moreover, the coating is chemically combined with the aluminum foil and has exceptional adherence to it. Probably for these reasons, the coating of this invention appears to have even better infrared absorption and heat transfer characteristics than the silicate coating of my prior application. That silicate coating is at least twice as thick as the coating of the present invention, does not appear to be chemically united to the foil, and lacks the exceptional adherence and chemical stability of the present coating.

While this invention has thus been described in connection with coating aluminum foil, it will be understood that it may be used to coat, with equal success, other aluminum articles, such as the outer sides of aluminum pie pans, the bottoms of aluminum cooking vessels, and the like. Furthermore, the coating of this invention may be used for many other articles, whether or not made of aluminum. The coating of this invention adheres excellently to other metals, such as copper, iron and steel, and may be advantageously used for coating sheet materials such as sheet copper, sheet iron and sheet steel where it is desired to increase their infrared absorption. However, the present invention is especially advantageous in connection with the coating of articles made of aluminum or aluminum alloy, because the above described chemical reaction at the interface affords a remarkable adherence and, as is well known, aluminum is a difficult material to coat satisfactorily.

While there is herein described, and in the drawings shown, illustrative embodiments of my invention, it is to be understood that the invention is not limited thereto, but may comprehend other proportions, process steps, details and features without departing from the spirit of the invention. I desire to be limited, therefore, only by the scope of the appended claims.

I claim:

1. An article having a surface provided with a closely adherent, extremely thin coating consisting primarily of glassy aluminum phosphate having uniformly suspended therein carbon black of a particle size not substantially exceeding 20 millimicrons, said coating containing 1 part by weight of anhydrous carbon black to from about 2.8 to about 5.6 parts by weight of anhydrous aluminum and phosphoric oxides, whereby the coating is rendered highly infrared absorbent.

2. An article having a surface provided with a closely adherent, extremely thin coating consisting primarily of glassy aluminum phosphate having uniformly suspended therein carbon black of a particle size not substantially exceeding 20 millimicrons, said coating being formed by the decomposition under heat of aluminum acid phosphate and containing 1 part by weight of anhydrous carbon black to from about 2.8 to about 5.6 parts by weight of anhydrous aluminum and phosphoric oxides, whereby the coating is rendered highly infrared absorbent.

3. An aluminum or aluminum alloy article having an surface provided with a closely adherent, extremely thin coating consisting primarily of glassy aluminum phosphate having uniformly suspended therein carbon black of a particle size not substantially exceeding 20 millimicrons, said coating being formed integrally with said article by the reaction under heat of aluminum acid phosphate, and said coating containing 1 part by weight of anhydrous carbon black to from about 2.8 to about 5.6 parts by weight of anhydrous aluminum and phosphoric oxides, whereby the coating is rendered highly infrared absorbent.

4. The combination as claimed in claim 3 in which the aluminum phosphate is at least predominately metaphosphate.

5. A smooth, homogeneous, free flowing, black liquid, adapted for use in producing infrared absorptive aluminum phosphate coatings, and consisting primarily of carbon black of a particle size not substantially exceeding 20 millimicrons uniformly dispersed in a water solution of aluminum acid phosphate, the mixture being decidedly acid in reaction and containing 1 part by weight of anhydrous carbon black to from about 2.8 to about 5.6 parts by weight of anhydrous aluminum and phosphoric oxides.

6. A smooth, homogeneous, free flowing, black liquid adapted for use in producing infrared absorptive aluminum phosphate coatings, and consisting of a water solution of aluminum acid phosphate in which carbon black of a particle size not substantially exceeding 20 millimicrons is uniformly dispersed by an anionic dispersing agent, the mixture being decidedly acid in reaction and the weight of anhydrous carbon black being from about one-third to about one-fifth of the weight of anhydrous aluminum and phosphoric oxides.

7. A method of manufacture of an article coated with an infrared absorbent glassy film consisting primarily of aluminum phosphate and carbon black, which comprises uniformly dispersing in water carbon black of a particle size not substantially exceeding 20 millimicrons, acidifying the aqueous dispersion, combining the acidified dispersion with aqueous aluminum acid phosphate in such proportions that the mixture contains 1 part by weight of anhydrous carbon black to from about 2.8 to about 5.6 parts by weight of anhydrous aluminum and phosphoric oxides, applying a thin coating of the resulting acid liquid mixture to the article to be coated, evaporating the free water from the coating, and curing the coating by subjecting it to a temperature above the temperature of decomposition of aluminum acid phosphate into aluminum metaphosphate.

8. A method of manufacture according to claim 7, in which the curing step is continued sufficiently long to convert at least most of the aluminum acid phosphate into aluminum metaphosphate.

9. A method of manufacture according to claim 7, in which the original carbon black dispersion in water contains an anionic dispersing agent and is thixotropic and alkaline, and is acidified so as to be nearly as acid as the aqueous aluminum acid phosphate.

10. A method of manufacture according to claim 9, in which the pH of the coating liquid is from 1 to 3.

References Cited by the Examiner
UNITED STATES PATENTS

| | | | |
|---|---|---|---|
| 1,773,105 | 8/30 | Jones | 252—508 |
| 1,836,600 | 12/31 | Jones | 252—508 |
| 1,881,444 | 10/32 | Flanzer | 252—508 |
| 2,223,924 | 12/40 | Stephan | 252—508 |
| 2,564,864 | 8/51 | Thompson | 148—6.16 |
| 2,637,711 | 5/53 | Auer | 106—307 |
| 2,743,203 | 4/56 | Steinherz | 148—6.15 |
| 2,759,830 | 8/56 | Touceda | 99—171 |
| 2,912,336 | 11/59 | Perino | 99—174 |
| 3,070,460 | 12/62 | Huppke | 117—127 |

RICHARD D. NEVIUS, *Primary Examiner.*